United States Patent [19]
Nakagawa et al.

[11] Patent Number: 4,965,823
[45] Date of Patent: Oct. 23, 1990

[54] ECHO CANCELLER

[75] Inventors: Fujio Nakagawa; Akira Kanemasa, both of Tokyo, Japan

[73] Assignee: NEC Corporation, Tokyo, Japan

[21] Appl. No.: 267,891

[22] Filed: Nov. 7, 1988

[30] Foreign Application Priority Data

Nov. 6, 1987 [JP] Japan .................................. 62-281331

[51] Int. Cl.[5] ........................................... H04M 1/00
[52] U.S. Cl. .................................. 379/411; 379/406; 379/410; 370/32.1
[58] Field of Search ....................... 379/406, 410, 411; 370/32, 32.1; 375/120

[56] References Cited

U.S. PATENT DOCUMENTS

4,695,998  9/1987  Schollmeier et al. .............. 370/32.1

FOREIGN PATENT DOCUMENTS

0192359  8/1986  European Pat. Off. ............ 379/411

OTHER PUBLICATIONS

"Clock Sensitivity Reduction in Echo Cancellers," Electronics Letters, S. A. Cox, 7-4-85; vol. 21, No. 14, pp. 585-586.

*Primary Examiner*—Jin F. Ng
*Assistant Examiner*—Jhancy Augustus
*Attorney, Agent, or Firm*—Sughrue, Mion, Zinn, Macpeak & Seas

[57] ABSTRACT

An echo canceller of this invention cancels an echo signal input to a sampler through an echo path upon 2-wire/4-wire conversion. The echo canceller includes a filter having a characteristic for reducing a tail of an echo response waveform and inserted between an output terminal of the sampler and a reception output terminal, a first transversal filter for generating a first canceling signal for canceling an echo signal sampled at equal sampling clock intervals after the echo signal passes through the filter, a second transversal filter for canceling a deviation of a sampling value obtained when sampling clock is jittered before the deviation passes through the filter, an enable/disable unit for enabling/disabling a tap output of the second transversal filter, and a controller for, from a moment at which the sampling clock is jittered, controlling the enable/-disable unit to cancel a deviation in correspondence with a deviation value of an actual sampling value.

2 Claims, 4 Drawing Sheets

ECHO CANCELLER

BACKGROUND OF THE INVENTION

The present invention relates to an echo canceller and, more particularly, to an echo canceller which has a function of compensating for a sampling clock jitter.

In an echo canceller, sampling clocks for sampling an echo signal must be stable. If a so-called sampling clock jitter, e.g., nonuniform sampling clock intervals or an out-of-phase state of sampling clocks as a whole, occurs, echo canceling power of the echo canceller is extremely reduced.

However, in a conventional echo canceller, an appropriate countermeasure against a variation in sampled echo signal caused by the sampling clock jitter is not taken.

SUMMARY OF THE INVENTION

It is an object of the present invention to provide an echo canceller which can eliminate the conventional drawbacks, and has a function of compensating for a variation in sampled echo signal caused by the sampling clock jitter.

According to the present invention, an echo canceller for canceling an echo signal input to a sampler through an echo path upon 2-wire/4-wire conversion, comprises: a filter having a characteristic for reducing a tail of an echo response waveform and inserted between an output terminal of the sampler and a reception output terminal; a first transversal filter for generating a first canceling signal for canceling the echo signal sampled by the sampler when sampling clock intervals are equal, after the echo signal passes through the filter; a second transversal filter for canceling a deviation of the echo signal sampled when a sampling clock is jittered, before the deviation passes through the filter; enable/disable means for enabling/disabling a tap output of the second transversal filter; and controller means for, from a moment at which the sampling clock is jittered, controlling the enable/disable means to cancel the deviation in correspondence with a deviation value of an actual sampling value.

DETAILED DESCRIPTION OF THE PREFERRED EMBODIMENT

A preferred embodiment of the present invention will be described hereinafter in detail with reference to the accompanying drawings.

Figure 1:
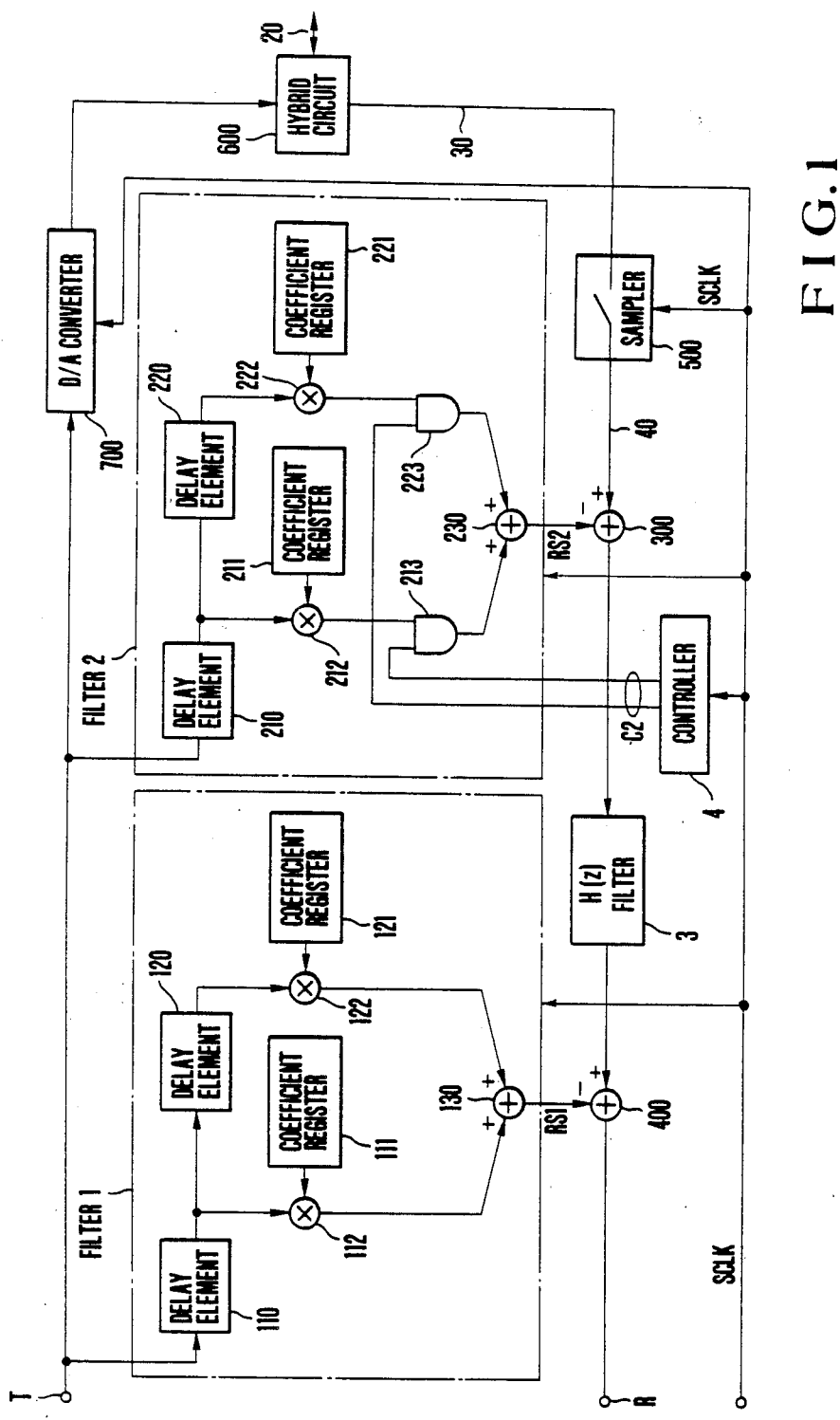
FIG. 1 is a block diagram showing an arrangement of an embodiment of the present invention.

FIG. 1 shows an arrangement according to an embodiment of the present invention.

Referring to FIG. 1, a digital transmission signal supplied from an input terminal T is input to a D/A converter 700 and filters 1 and 2. The D/A converter 700 converts the input signal into an analog pulse signal, and outputs the analog pulse signal to a hybrid circuit 600. The hybrid circuit 600 performs 2-wire/4-wire conversion, and sends the analog transmission signal onto a 2-wire transmission path 20. A reception signal received through the 2-wire transmission path 20 is supplied to a sampler 500 through a line 30 by the hybrid circuit 600. The reception signal input to the sampler 500 through the line 30 includes a transmission signal received through a so-called echo path including the D/A converter 700, the hybrid circuit 600, and the sampler 500 as an echo signal.

The sampler 500 samples the input signal thereof using a sampling clock SCLK supplied from a timing signal generator (not shown). An echo canceling signal RS2 output from the filter 2 is subtracted from the output of the sampler 500 by an adder 300. The output of the adder 300 is supplied to an adder 400 through the filter 3. An echo canceling signal RS1 supplied from the filter 1 is subtracted from the output of the adder 300 by the adder 400. The signal thus obtained is output from an output terminal R as a reception signal.

In the filter 1, the transmission signal is held in delay elements 110 and 120. The output signals from the delay elements 110 and 120 are respectively multiplied with coefficients held in coefficient registers 111 and 121 by multipliers 112 and 122. The outputs from the multipliers 112 and 122 are added to each other by an adder 130. The sum is output to the adder 400 as the echo canceling signal RS1. The filter 1 is always operated in synchronism with the sampling clock SCLK of the sampler 500.

In the filter 2, the transmission signal is held in delay elements 210 and 220. The outputs of the delay elements 210 and 220 are respectively multiplied with coefficients stored in coefficient registers 211 and 221 by multipliers 212 and 222. The outputs of the multipliers 212 and 222 are input to the corresponding one input terminals of AND gates 213 and 223, respectively. The other input terminal of each of the AND gates 213 and 223 receives a control signal C2 supplied from a controller 4 (to be described later). The outputs of the AND gates 213 and 223 are added to each other by an adder 230, and the sum is output to the adder 300 as the echo canceling signal RS2.

The controller 4 receives the sampling clock SCLK, and detects its state. The controller 4 outputs the control signal C2 to the AND gates 213 and 223 of the filter 2 in accordance with the detected state of the sampling clock SCLK.

The operation of the overall circuit shown in FIG. 1 will be described below.

For the sake of descriptive simplicity, a description will be made to give a transfer function H(Z) of the filter 3 as H(Z)=1, and finally, a case of H(Z)≠1 will be described.

A method of generating the echo canceling signal RS1, i.e., the operation of the filter 1 will be described first. The filter 1 generates an echo canceling signal for a sampling value obtained at equal sampling clock intervals, and comprises a 2-tap transversal filter.

Figure 2:
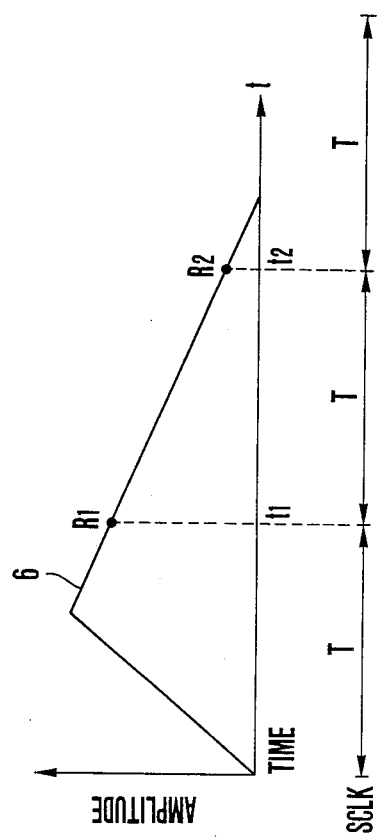
FIG. 2 is a waveform chart for explaining the operation of the circuit shown in FIG. 1.

In FIG. 2, reference numeral 6 denotes a unit pulse response waveform (to be referred to as an echo response hereinafter) of the echo path. A sampling interval of the sampling clocks SCLK is given as T. Reference symbols $t_1$ and $t_2$ denote sampling times of the sampling clock SCLK. Sampling values of the echo response 6 at the sampling times $t_1$ and $t_2$ are respectively $R_1$ and $R_2$. More specifically, values $R_1$ and $R_2$ are echo components to be canceled from the output of the sampler 500 when the sampling clock SCLK is in the stable state, i.e., is sampled at equal intervals.

The coefficient registers 111 and 121 of the filter 1 hold values $R_1$ and $R_2$, so that a signal corresponding to a sampling value of an echo signal can be generated by a convolution operation of the transmission signal and the coefficients stored in the coefficient registers. More specifically, the filter 1 causes the multipliers 112 and 122 to multiply the transmission signal held in the delay elements 110 and 120 with the coefficients held in the coefficient registers 111 and 121, respectively, and causes the adder 130 to add the outputs from the multipliers 112 and 122, thus generating the echo canceling signal RS1. This operation is always performed in synchronism with the sampling clock SCLK of the sampler 500.

A method of generating the echo canceling signal RS2, i.e., the operation of the filter 2 will be described below. The filter 2 generates the echo canceling signal RS2 corresponding to a deviation of a sampling value obtained when a reception timing, i.e., the sampling clocks SCLK are jittered from equal time intervals, i.e., when sampling clock jitter occurs, and its operation varies depending on the relationship between reception and transmission timings. This embodiment exemplifies a case wherein the transmission and reception timings are identical. Other cases can be coped with by changing the operation timing of the filter 2.

Figure 3:
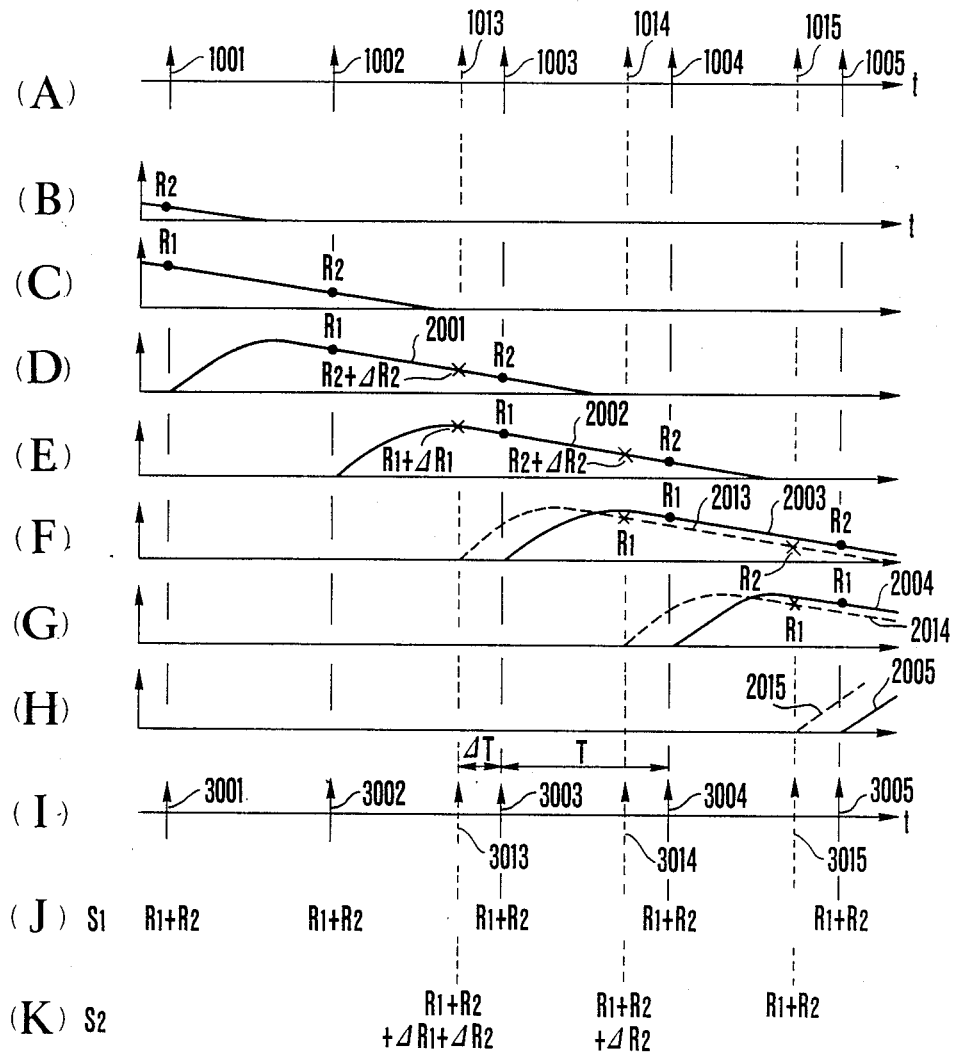
FIGS. 3(A) to 3(K) are charts for explaining the operation of the circuit shown in FIG. 1.

FIG. 3(A) shows a transmission timing, and FIG. 3(I) shows a reception timing, i.e., sampling timing. In FIG. 3(A), arrows 1001 to 1015 indicate transmission timings, and of these arrows, solid arrows 1001 to 1005 represent a case of equal time intervals, and dotted arrows 1013 to 1015 represent cases wherein the transmission timings are deviated from the equal time intervals. In FIG. 3(I), arrows 3001 to 3015 represent reception (sampling) timings. Solid arrows 3001 to 3005 represent a case of reception timings at equal intervals, and dotted arrows 3013 to 3015 represent a case wherein the reception timings are deviated from the equal time intervals.

FIGS. 3(B) to 3(H) represent echo responses when transmission data is "1" at all the transmission timings 1001 to 1015. Since all the transmission data are "1", echo responses 2001 to 2015 coincide with the waveform of the echo response 6 shown in FIG. 2. An actual echo signal is obtained by superposing these echo responses shown in FIGS. 3(B) to 3(H). Note that marks "." and "x" represent sampling values at the respective timings. FIG. 3(J) shows an echo sampling value $S_1$ in which the echo responses are included when the reception timings are at equal time intervals, and FIG. 3(K) shows an echo sampling value $S_2$ in which the echo responses are included when sampling jitter occurs.

As can be understood from the echo sampling values $S_1$ and $S_2$ shown in FIGS. 3(J) and 3(K), respectively, when the transmission and the reception timings are identical, the influence of the deviation of the reception timing from the equal time interval appears for a while immediate after the deviation occurs, and disappears thereafter. More particularly, at the deviated transmission timing 1013 (or reception timing 3013), the echo sampling value $S_2$ is deviated from the echo sampling value $S_1$, i.e., $R_1+R_2$ at the stable transmission timing 1003 (or reception timing 3003) by $\Delta R_1+\Delta R_2$. At the next transmission timing 1014, a difference between the echo sampling values $S_2$ and $S_1$ is $\Delta R_2$. At the next timing 1015, the echo sampling values $S_1$ and $S_2$ are equal to each other, i.e., $R_1+R_2$, and the influence of the deviation of the sampling timing is eliminated.

The filter 2 generates the echo canceling signal RS2 corresponding to a difference between the echo sampling values $S_1$ and $S_2$ under the control of the controller 4. The filter 2 comprises a 2-tap transversal filter as in the filter 1. The coefficient registers 212 and 222 of the filter 2 hold deviations $\Delta R_1$ and $\Delta R_2$ of the sampling values of the echo responses, respectively.

Figure 4:
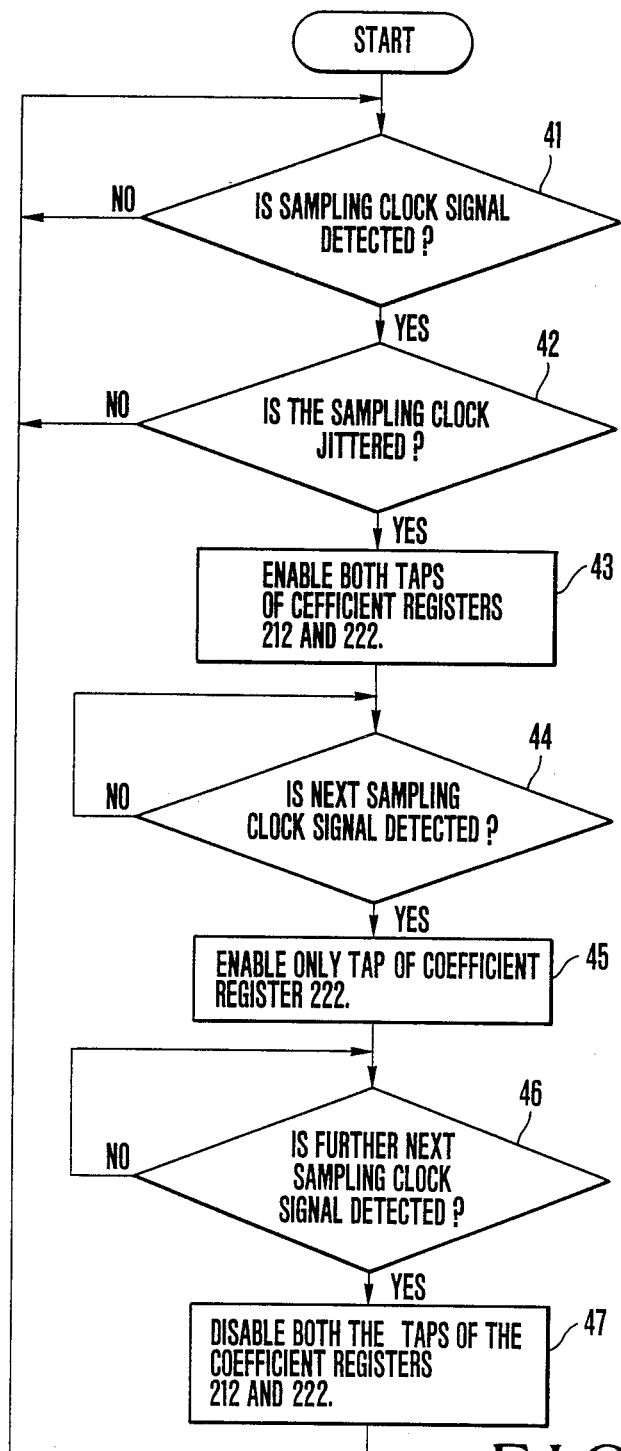
FIG. 4 is a flow chart for explaining the operation of the circuit shown in FIG. 1.

FIG. 4 is a flow chart showing generation procedures of the echo canceling signal RS2 by the controller 4. In FIG. 4, if it is determined in steps 41 and 42 that the sampling clock SCLK is jittered, the taps of both the coefficient registers 212 and 222 are enabled. At the next sampling timing (step 44), the tap of only the coefficient register 222 is enabled in step 45. At the third and subsequent sampling timings, the taps of the coefficient registers 212 and 222 are disabled in step 46.

The above description is applied to the case of the transfer function $H(Z)=1$.

The case of the transfer function $H(Z) \neq 1$ will be explained below. The filter 3 is a filter for reducing the tail of the echo response 6 (FIG. 2), and has an effect of decreasing the number of taps of a filter for generating an echo canceling signal. Therefore, as in the filter 1 shown in FIG. 1, cancelation of the echo signal is normally performed to the output of the filter 3. However, as for the influence of the jitter of timings, a transient response of the filter 3 appears immediately after the jitter occurs. When the influence of the jitter of timings is to be canceled from the output of the filter 3, the coefficient values of a transversal filter for generating an echo canceling signal cannot be uniquely determined. However, like in the filter 2 of this embodiment, if the influence is removed at a stage before the filter 3, it can be removed by the same operation as in the case of $H(Z)=1$.

According to the present invention as described above, an echo signal obtained at equal sampling time intervals is canceled at a stage after the filter 3 for reducing the base of an echo response, and a deviation of an echo signal obtained when a sampling timing is deviated from equal time intervals is canceled at a stage before the filter 3. Thus, in an echo canceller having the filter 3, the influence of the jitter of the sampling timings can be eliminated.

What is claimed is:

1. An echo canceller for canceling an echo signal which results from 2-wire/4-wire conversion and is sampled by a sampler, comprising:
   a filter connected with an output of said sampler;
   a first transversal filter which has the coefficients representing the echo path response wave at fixed sampling timing and generates a first echo canceling signal;
   a first subtracting means which subtracts said first echo canceling signal from an output of said filter connected with said sampler;
   a second transversal filter which has the coefficients representing the deviation of the sampled value of the echo path response wave and generates a second echo canceling signal;
   a second subtracting means which subtracts said second echo canceling signal from said output of said sampler;
   enable/disable means for enabling/disabling a tap output of said second transversal filter; and controller means for, from a moment at which a sampling clock is jittered, controlling said enable/disable means, using a control signal, for canceling the deviation of sampled echo signal.

2. An echo canceller according to claim 1, wherein said controller means, when it detects the sampling clock jitter, controls said second transversal filter to enable all taps of a plurality of coefficient registers of said second transversal filter, to enable taps of some of said plurality of coefficient registers during sampling at next and subsequent sampling clocks, and to disable the taps of all of said coefficient registers after predetermined sampling.

* * * * *